(12) United States Patent
Schneider et al.

(10) Patent No.: US 8,683,897 B2
(45) Date of Patent: Apr. 1, 2014

(54) LATHE FOR MANUFACTURING OPHTHALMIC LENSES MADE OF PLASTIC

(75) Inventors: Gunter Schneider, Marburg (DE); Helwig Buchenauer, Dautphetal-Buchenau (DE); Ulf Börner, Marburg (DE); Klaus Krämer, Dautphetal-Friedensdorf (DE)

(73) Assignee: Schneider GmbH & Co. KG, Fronhausen (DE)

( * ) Notice: Subject to any disclaimer, the term of this patent is extended or adjusted under 35 U.S.C. 154(b) by 1061 days.

(21) Appl. No.: 12/660,805

(22) Filed: Mar. 4, 2010

(65) Prior Publication Data
US 2010/0224039 A1 Sep. 9, 2010

(30) Foreign Application Priority Data
Mar. 4, 2009 (DE) .......................... 10 2009 011 194

(51) Int. Cl.
*B23B 17/00* (2006.01)
*B23Q 1/00* (2006.01)
(52) U.S. Cl.
USPC .............................................. 82/149; 82/163
(58) Field of Classification Search
USPC ............. 82/149, 163, 903, 904; 409/137, 141
See application file for complete search history.

(56) References Cited

U.S. PATENT DOCUMENTS

| 5,105,692 A * | 4/1992 | Dona et al. ....................... 82/123 |
| 5,231,587 A * | 7/1993 | Frost ............................. 700/164 |
| 5,919,013 A * | 7/1999 | Savoie ........................... 409/141 |
| 7,503,244 B2 * | 3/2009 | Nakamura et al. .............. 82/149 |
| 7,739,778 B2 * | 6/2010 | Fiedler et al. .................. 29/27 C |

FOREIGN PATENT DOCUMENTS

| DE | 1 727 863 | 8/1956 |
| DE | 10 2005 021 638 B4 | 3/2007 |
| DE | 10 2005 021 640 B4 | 8/2007 |
| EP | 1 719 582 A1 | 11/2006 |

* cited by examiner

*Primary Examiner* — Will Fridie, Jr.
(74) *Attorney, Agent, or Firm* — Hudak, Shunk & Farine Co LPA

(57) ABSTRACT

A turning machine for producing non rotationally symmetric surfaces of synthetic spectacle lenses, having a support plane E, a machine bed made of cast iron with a width b1 and a mass m1, a linear motor with an actuator comprising a turning tool holder and an oscillation axis Z, a workpiece spindle with a rotational axis C and a movement axis X, wherein the machine bed has at least two bearing surfaces arranged at a distance for the linear motor and for the workpiece spindle, and between the two bearing surfaces, a chip space is provided which is limited at least partially by the machine bed, wherein the linear motor is supported on the first bearing surface and the workpiece spindle is supported on the second bearing surface in relation to the chip space opposite the linear motor, wherein the mass of the machine bed has the maximum value m1, and the value m1 lies between 100 kg and 500 kg, between 150 kg and 300 kg, between 170 kg and 200 kg or 180 kg. A turning machine, in which the ratio of the mass m1 of the machine bed to a moved mass m2 of the linear motor 3 is greater than a quotient Q, wherein the quotient Q is between 1:500 and 1:20, between 1:60 and 1:30 or between 1:140 and 1:100, or 1:40 or 1:120.

23 Claims, 11 Drawing Sheets

LATHE FOR MANUFACTURING OPHTHALMIC LENSES MADE OF PLASTIC

FIELD OF THE INVENTION

The invention relates to a turning machine for producing non rotationally symmetric surfaces of synthetic spectacle lenses, comprising a support plane, a machine bed, preferably made of cast iron with a width b1 and a mass m1, a linear motor with an actuator comprising a turning tool holder and an oscillation axis Z, a workpiece spindle with a rotational axis C and a movement axis X, wherein the machine bed comprises at least two bearing surfaces arranged at a distance for the linear motor and for the workpiece spindle, and between the two bearing surfaces, a chip space is provided which is limited at least partially by the machine bed, wherein the linear motor is supported on the first bearing surface and the workpiece spindle is supported on the second bearing surface in relation to the chip space opposite the linear motor.

BACKGROUND OF THE INVENTION

The part of the turning machine is referred to as the machine bed which for the purpose of supporting the tool and workpiece drives is designed in a sufficiently rigid manner and which to a great extent prevents the occurrence of vibrations between the different bearings. The machine bed is thus made of relatively solid material such as cast iron, granite or polymer concrete, and accordingly comprises a high degree of wall thickness. The solidity of the material used in connection with sufficiently high wall thicknesses guarantee on the one hand a sufficiently high degree of rigidity, which restricts a vibration introduction or vibration amplitude. On the other, in connection with the existing mass, the largest possible suppression of the vibration is achieved. The vibrations which are introduced are thus absorbed down to a minimum. The machine bed is, as far as possible, designed as a single part, since each division forms a weak point. Parts which provided only a low level of support to the rigidity can be designed as add-on parts. Machine bed parts which are of relevance to rigidity and strength usually comprise a wall thickness of over 7 mm. Exceptions can be add-on parts made of aluminium, which due to the production frequency comprise greater wall thicknesses. When polymer concrete is used in particular, wall thicknesses of at least 15 mm are usually necessary for machine bed parts which are of relevance to rigidity.

The machine bed can be supported on a machine frame via cushioning bearings, in such a manner that it is de-coupled from the vibrations. In this case, the machine frame fulfils a transportation, table and support function for the machine bed, as well as an installation space function for add-on parts. The machine frame rests via mounting feet on a bearing or floor area. The support plane is ideally tensioned by the mounting feet or their mounting surface. The fact that the mounting surfaces do not lie precisely on one plane due to the alignment according to a floor surface is here not taken into account. The machine frame can in relation to the vertical structure also be designed in two or more parts. Generally, it can be provided that the machine bed is supported via cushioning bearings directly on a floor surface. This depends on the height of the machine bed or the height of the floor or platform surface, which then fulfils the machine frame function.

The space in which the direct flight of chips can be anticipated is referred to as the chip space. Starting from the working space, i.e. the space in which the movement of the tool or workpiece can be anticipated, the chip space is wider or larger, and ends at the respective wall against which the chips impact and flow with the coolant or lubricant. Walls of this type are usually raised in relation to the horizontal plane, so that a run-off of the coolant and lubricant together with the chips to an outflow opening of the chip space is guaranteed. In the area of the outlet opening, the different coolant and lubricant flows run together and leave the chip space. A coolant and lubricant channel is connected to the outlet opening, which guides the coolant and lubricant flow downwards and then deflects it towards one side.

The term "linear motor" comprises the class of asynchronous motors, in particular the class of synchronous motors both in the flat design as well as in the variant as plunger coil or voice-coil drive.

A turning machine for machining optical workpieces is already known from DE 10 2005 021 638 B4. The turning machine comprises a fast tool arrangement and a workpiece spindle arrangement, which is supported on a rigid machine bed lower part and is covered by a machine upper part. The machine bed lower part and the machine upper part are formed as a single part made of polymer concrete. The machine bed lower part fulfils the function of the machine frame. The machine bed overall restricts a chip space downwards and to the side, wherein the chip space comprises a run-off opening in the area of a floor wall, to which a coolant and lubricant channel is connected. Due to the coolant and lubricant channel, the medium to be removed is removed collectively from the chip space and then deflected towards the side.

With turning machines for synthetic spectacle lenses, the use of a highly dynamic turning tool which oscillates at between 50 Hz and 200 Hz is necessary in order to achieve the highest possible workpiece rotation speed and thus the lowest possible machining time. In this manner, a sufficient high cutting speed of the turning process is also achieved. As a rule, linear motors are used as a drive for the tool, with the turning tool directly affixed to their actuator. Thus, a direct implementation of the actuator or motor movement is guaranteed without the use of gear members.

The linear motors, which can be used for a sufficiently high frequency oscillation movement, must however comprise sufficiently large primary and secondary components in order to be able to generate the necessary acceleration forces. However, the size of the primary and secondary components entails a relatively high weight. In order to make the accelerating actuator as light as possible, it is designed without iron, and advantageously comprises a light synthetic core with windings arranged on it. The actuator is the primary component in the case of the synchronous motor, which must be moved such that it oscillates at a high frequency.

When producing spectacle lenses, very high precision is required, in order that the spectacle lens surface being produced while rotating requires the shortest possible subsequent polishing, or no subsequent polishing at all. The turning tool or its drive constantly induce vibrations into the machine bed due to the high frequency oscillation movement, which have a negative effect on the precision of the cutting or turning process of the spectacle lens surface.

In order that the required high precision can be guaranteed, the machine bed must on the one hand be designed with sufficient rigidity, particularly in relation to the oscillation movement between both bearing surfaces and taking into account the dynamic load connected with it. On the other hand, it is necessary to design the mass of the machine bed as large as possible, so that the vibrations introduced by the turning tool are suppressed as comprehensively as possible. This is also the case according to the principle of DE 10 2005

021 638 B4, where the upper part of the machine is formed of polymer concrete and is coupled as a single part with the machine part.

The mass used entails a corresponding weight on the one hand, and on the other, a corresponding constructional size of the turning machine.

The deformations which occur at the contact point between the tool and the workpiece as a result of the machining forces consist of the deformations of all components and machine bed elements involved in the force transfer. With a force flow and deformation analysis, the load of the individual components and machine bed elements and the respective portion of the overall deformations between the force contact points are examined. Due to the differently sized lever arms, the forces on the respective force contact point generate different moments in different directions, which cause a corresponding deformation of the machine bed.

With the structural design of the machine bed profiles, account should be taken of both the flexural load and the torsion load. Thus, the flexural strength depends mainly on the equatorial moment of inertia and the torsion strength depends primarily on the polar moment of inertia. Accordingly, persons skilled in the art attempt to achieve both large masses and close and large machine bed profiles with tool machines, in order to achieve maximum stability. Thus, all loads are taken into account. Materials with a high degree of vibration cushioning are sought which additionally provide a large machine bed mass, so that the machine bed is not excessively excited by vibrations.

SUMMARY OF THE INVENTION

The object of the invention is to design and arrange a turning machine for spectacle lenses of such a type that improved handling of the machine, while at the same time, a sufficiently rigid machine bed structure is guaranteed.

The object is attained according to the invention by means of the claims. Due to the drastic reduction in the mass of the machine bed, the machine can be designed significantly smaller overall, so that the handling which results is improved both in terms of transport and structural logistics as well as in terms of manipulation during operation. A reduction in the cast iron mass of the machine bed to a value $m_1$, wherein the value $m_1$ lies between 100 kg and 500 kg, between 150 kg and 300 kg, between 170 kg and 200 kg or 180 kg, appears initially to be of great disadvantage in the light of the size and frequency of the forces to be absorbed. During the development of the turning machine according to the invention, it has been shown that during the rotating production of spectacle lenses, the influence of the vibrations to which the machine bed is subjected, and which are less well compensated due to the lack of mass, is less than was assumed, and that the workpiece qualities achieved with the reduced mass of the machine bed are usable. Known fundamental principles for the development of a machine bed, such as the best possible ratio between the mass and the rigidity, were not ignored. The advantage entailed by the mass to date in relation to the suppression or cushioning of vibration amplitudes was overestimated. With regard to the field of use claimed, the rotating machining of spectacle lenses, it was found to be advantageous that in particular with machine beds made of cast iron, smaller amplitudes are entailed by a reduction in the mass and the connected increase in own frequency of the machine bed, which influence the machining process to a lesser extent than was anticipated.

The fact that the ratio of a moved mass $m_2$ of the linear motor to the mass $m_1$ of the machine bed is greater than a quotient Q, wherein the quotient Q lies between 1:500 and 1:20, between 1:300 and 1:30, between 1:250 and 1:30, between 1:150 and 1:30, between 1:60 and 1:30 or between 1:140 and 1:100, or 1:40 or 1:120, leads to a highly advantageous vibration behaviour during the highly dynamic cutting or turning process. The highly advantageous vibration behaviour is also achieved when a reduced mass of the machine bed according to the invention is used, as is explained above. This ratio entails the advantages described above with regard to the size of the machine. In order that the ratio according to the invention can be maintained, the machine bed—with the linear motors currently available—must be relatively small in terms of its design.

The moved mass $m_2$ includes the actuator of the linear motor including the moved bearing or guide parts and the turning tool holder. The actuator is usually the primary part of the motor which usually comprises the lightest possible, and thus iron-free, core. In the case of the classic linear motor, the actuator is supported within the motor housing or stator via corresponding bearing means. In the case of the voice coil or plunger coil drive, the plunger coil is as a primary part supported in front of or behind a guide part, which is supported on the stator side. The guide part is in this case also part of the moved mass $m_2$. With drives with rotating motors, with the moved mass, the moved mass of the gear should also be taken into account, alongside the mass of the rotor.

The quotient according to the invention can only be guaranteed with a relatively high moved mass, or with a relatively light machine bed. The moved mass is usually not larger than is necessary. For the purpose of maintaining the quotient Q according to the invention, it would accordingly be appropriate to reduce the mass of the machine bed, which in the light of the forces and frequencies to be absorbed appears, as described above, to be extremely disadvantageous.

The quotient Q, i.e. the ratio $m_1$ to $m_2$, should be regarded as a break in which the mass 1 is in the denominator and the mass $m_2$ is in the numerator. For the values given in the denominator, a tolerance of 3 should be taken into account, i.e. the given numeric values can deviate by 3. Thus for example, for the value 1:120, the values 1:117, 118, 1:119, 1:121, 1:122 and 1:123 are to be regarded as feasible and disclosed.

In the light of the linear drives available for the oscillating drive of the rotary chisel and its moved mass of 1.0 to 1.5 kg on the one hand, and in the light of the frequency range at least to be assumed of between 25 Hz and 200 Hz, in which the essential machining takes place on the other hand, the mass ratio according to the invention on the basis of the cast iron mass $m_1$ which is reduced according to the invention has been shown to be highly advantageous.

Furthermore, it can be advantageous when the movement axis X runs horizontally and in a direction at right-angles to the oscillation axis Z, or at right-angles to the rotation axis C, and with regard to the direction of the movement axis X adjacent to the linear motor, a cutter spindle with a spindle axis S is provided, wherein the spindle axis S is pitched in relation to the vertical at an angle of between 5° and 30°. The movement axis X can here be a translation or pivot axis. Thus, the axis combination for the rotating machining of spectacle lenses is advantageously supplemented.

Due to the horizontal movement axis X, the drive for the movement axis X can be smaller than with a movement axis X which is pitched in relation to the horizontal. Thus, no cooling of the drive is necessary.

The cutting spindle is provided approximately at the height of the outlet opening with regard to the direction of the movement axis X. This incorporates with regard to the anticipated chip flight path during cutting a distance which runs in the horizontal direction between the outlet opening and the spindle axis S of up to 100 mm or 200 mm. In addition, it can be determined that the rotational direction of the cutting spindle should be selected in such a manner that the chips created are thrown towards the outlet opening.

It can also be advantageous when the workpiece spindle comprises a translation axis W which runs at right-angles to the movement axis X. Thus, the axis combination to the rotating production of spectacle lenses is further supplemented, so that the optically active surface of the spectacle lens, as well as flexible edge machining, are possible.

The translation axis W can also run parallel to the rotational axis C, wherein as a deviation of this or as a supplement, a pitch in relation to the oscillation axis Z is provided.

Here, it can advantageously be provided that the machine bed is also a cast iron bed which is open below, which comprises several transverse ribs which run in the direction of the oscillation axis Z and/or at least one longitudinal rib which runs in the direction of the movement axis X, wherein the transverse ribs extend between the bearing surface for the linear motor and the bearing surface for the workpiece spindle. Due to the fact that the machine bed is open downwards, no core bearings are required within the respective rib which negatively influence the formation or rigidity of the respective rib. Additionally, due to the lack of core bearings, a greater installation space is available for the diagonal ribs. In contrast to a closed machine bed profile, the deflection curve of which lies in the centre of the machine bed profile, with a machine bed which is open below, the deflection curve is displaced to the closed side of the machine bed. The distance between the deflection curve and a load contact point is smaller. This has an advantageous effect on the vibration behaviour of the machine bed. The transverse rib, which runs parallel to the oscillation movement, guarantees a high degree of rigidity relating to the high-frequency oscillation load during the rotation movement, in particular since the transverse ribs connect the bearing surface of the linear motor to the bearing surface of the workpiece spindle. During the highly dynamic rotational movement, the vibrations are accordingly ideally absorbed by the two transverse ribs. The rigidity of the transverse rib is supplemented by the longitudinal rib. In addition to the transverse ribs and the longitudinal rib, machine bed walls are provided which limit the machine bed to the side or to the front and rear, and which are arranged parallel to the respective rib.

The fact that the transverse rib is designed to be at least 50% to 90% of the height of a machine bed in the area of the bearing surface for the linear motor guarantees a high degree of rigidity of the machine bed between the bearing surface for the linear motor and the bearing surface for the workpiece spindle. A requirement for this, when a chip space is present with a floor wall which slopes downwards or which is inclined, is that the transverse rib or the bearing surface for the linear motor is arranged with regard to a length 1 of the chip space in the same half of the machine bed in which the chip space comprises a lesser depth due to the downwards slope of the floor wall. In the other half, the depth of the chip space is greater, since the floor wall slopes continuously downwards in order to provide optimum chip transport. In this half, a sufficiently high design of the transverse ribs is not guaranteed.

It can be of significance to the present invention when at least one transverse rib is thicker than the longitudinal rib. Since the transverse ribs are required to absorb a large portion of the load, a correspondingly thick design is provided, wherein the longitudinal and diagonal ribs are thinner due to the mass which is to be maintained at a low level according to the invention.

In connection with the design and arrangement according to the invention, it can be advantageous when the machine bed comprises several diagonal ribs, which can be arranged diagonally or at a half-angle with regard to the transverse ribs and the longitudinal rib. The diagonal ribs support the torsional rigidity of the machine bed.

It can furthermore be advantageous when the machine bed comprises a maximum of three bearing points, wherein at least one first bearing point is provided directly or at least in the area below the bearing surface for the linear motor. The weight entailed by the linear motor does thus not have to be borne by the machine bed, i.e. a transfer in the horizontal direction of the weight load by the machine bed in the form of a bending beam is prevented. This has a positive effect on the vibrations introduced by the linear motor, in particular in the light of the fact that the linear motor conducts highly dynamic, oscillating movements with up to 300 Hz, which constitute the major part of the vibrations introduced overall into the machine bed.

It can also be advantageous when the second and a third bearing point are provided below the bearing surface for the workpiece spindle on a front and a rear end of the machine bed. This refers to the front and rear end of the bearing surface for the spindle linear drive. The bearing surface for the spindle linear drive and the support surface for the linear motor which protrudes transverse to it constitute the basic T-shape of the machine bed. The three bearing points are preferably located in the area of the ends of this T-shaped design, since the mass percentages of the machine bed which are located at a distance from the site of the introduction of the vibration were evaluated as being more critical in their vibration behaviour than the percentages which were closer. Due to the overlay of the outer corners or ends of the machine bed, these are highly positively influenced in terms of their vibration behaviour.

Furthermore, it can be advantageous when the bearing point comprises a vertical displacement v4, v4' with regard to the lower edge of the machine bed, which is at least between 20 mm and 70 mm. Thus, the respective cushioning bearing which is to be arranged below the bearing point is integrated into the machine bed with regard to the vertical axis. The installation height is reduced overall.

Here, it can be advantageous when the machine bed comprises a lower edge, and between the lower edge and the bearing surface, a vertical displacement is provided with the maximum value v3, wherein the value v3 lies between 100 mm and 300 mm, between 150 mm and 250 mm or 200 mm. The construction height of the machine bed is thus very small, which ultimately leads to a low handling height of the turning machine. The height of the ribs of the machine bed to be realised with this construction height is sufficient in order to achieve the required rigidity due to the reduced mass.

The distance between the respective bearing surface of the drive and the corresponding bearing point of the cushioning bearing accordingly has a value v3-v4 of between 30 mm and 280 mm.

Ultimately, it can be advantageous when the turning machine has a depth with the maximum value t1 with regard to an operator position, and the value t1 lies between 800 mm and 1050 mm, between 850 mm and 980 mm, between 870 mm and 950 mm, or 930 mm. The manipulation or operation of the machine is thus improved. Furthermore, the machine comprises a base which is accordingly short. Ultimately, due to the low depth, the machine can be transported into commercial areas through the majority of doors with a width of 900 mm to 1000 mm.

For this purpose, it can also be advantageous when the machine bed has the width with a maximum value b1 with regard to the operator position, and the value b1 lies between 500 mm and 900 mm, between 600 mm and 800 mm or 680 mm. The low width is also possible due to the use of the reduced mass according to the invention. The width is determined by the width of the tool and workpiece drives which are located opposite in the direction of the oscillation axis Z during machining, as well as the width of the chip space which is provided between them.

Furthermore, it can be advantageous when the rotational axis C of the workpiece spindle comprises a vertical displacement with regard to the support plane of the turning machine, which has the maximum value v1, wherein the value v1 lies between 600 mm and 1050 mm, between 700 mm and 900 mm or 830 mm. The height of the workpiece spindle is the value which is characteristic for manipulating a manually operable turning machine, in particular for the regular workpiece replacement. Due to the height according to the invention, a convenient workpiece replacement is guaranteed, even for shorter persons.

Furthermore, it can be advantageous when the chip space is limited to one side by at least one wall of the machine bed which is pitched in relation to the horizontal axis, in which the run-off opening is provided, wherein the run-off opening of the chip space is arranged in such a manner that the medium to be transported leaves the chip space towards one side—not downwards. The medium to be removed, consisting of coolant and lubricant as well as chips, first collects on the run-off opening and, having been collected, is then guided on from there. It flows in an essentially horizontal flow direction which is inclined by a maximum of 30°. The outlet of the turning machine, which is connected to the run-off opening, is thus significantly higher than an outlet in which the flow direction runs essentially in a vertical direction from the run-off opening. This would entail a loss of height which would result in a lower run-off. The medium can in the case claimed be fed into a collecting tray without additional means such as a lifting device. It is also not necessary to displace the collecting tray downwards in order to guarantee as deep an inlet opening as possible.

Here, it can be advantageous when the chip space comprises a length l with regard to the movement axis X and the run-off opening is arranged with regard to the operator position in a rear quarter of the chip space or in a rear wall of the chip space. The outlet opening is thus provided on the side opposite the operator, in which neither the operator position nor a drive is provided.

Furthermore, it can be advantageous when a paneling is provided with an access opening, which guarantees a regular manual workpiece, tool and motor replacement, and which comprises an edge, wherein the edge comprises a maximum vertical displacement with regard to the support plane, which has a maximum value v2, wherein the value v2 lies between 900 mm and 1200 mm, between 950 mm and 1100 mm or 1030 mm. The drive, i.e. the workpiece spindle, the cutting spindle or the linear motor and their further functioning means such as cooling, electrical supply etc. are to be regarded as the motor. The height of the lower edge guarantees a convenient and comprehensive manipulation during running operation, i.e. in particular the manual workpiece replacement on the one hand, and maintenance of the machine on the other. The access height is here the same.

The access height is horizontally aligned, i.e. access is from above, as with a box. The lower edge of the access opening is thus overlapped, as it were.

Here, it can be advantageous when a paneling is provided which comprises at least one lid with a recess which is supported in such a manner that it can be pivoted, wherein the recess at least partially forms the access opening, and the lid comprises a depth t2 which is at least 80% of the depth t1 of the turning machine, and the lid has a width b2 which is at least between 80% and 100% of the width b1 of the machine bed. When the lid is opened, all parts of the machine which are essential for the machining, in particular the drives, are thus accessible.

The lid can also be formed from several partial lids, which are arranged adjacent to each other. The recess can here be provided in one of the partial lids, or be formed by a corresponding arrangement of the partial lids around the access opening. The lid is essentially horizontally arranged, or runs parallel to the movement axis X. Thus, the lowest possible structural height is guaranteed.

It can also be advantageous when a switch cabinet is provided which is arranged to the left or right of the machine bed with regard to the operator position. With regard to the direction of the rotational axis C or the oscillation axis Z, the switch cabinet is placed in front of or behind the machine bed. The lesser depth of the turning machine is thus not impaired.

Furthermore, it can be advantageous when the workpiece spindle comprises a screen part which screens the workpiece spindle in the direction of the movement axis X against a part of the chip space. Thus, the chip flight is limited to the area of the chip space, in which the workpiece spindle is placed. If the workpiece spindle is located at one end of the chip space, as it is during the cutting process, the remaining chip space is protected against chip flight.

In this context, it can be advantageous when a screen wall is provided which is firmly connected to the machine bed, which together with the screen part separates the workpiece spindle in the direction of the movement axis X from a part of the chip space. Since the screen wall moves with the workpiece spindle in the direction of the movement axis X, a corresponding distance from the chip space walls on the one hand, and on the other hand to the tools, in particular the rotary chisel, is necessary. A screen part accordingly guarantees at least in one position of the workpiece spindle an increased separation from the remaining chip space. This applies in particular to the position on the cutting spindle, i.e. during cutting.

Ultimately, it is advantageous when in the functional embodiment, an overall mass with the maximum value m3 is specified, wherein the value m3 lies between 500 kg and 1000 kg, between 600 kg and 800 kg, between 670 kg and 780 kg or 750 kg. With the design of the machine bed according to the invention, a lower overall mass of the turning and cutting machine can be achieved. This extends the possible use of the machine in areas with a relatively low floor load.

BRIEF DESCRIPTION OF THE DRAWINGS

Further advantages and details of the invention are explained in the patent claims and in the description and figures, in which:

DETAILED DESCRIPTION OF THE INVENTION

Figure 1:
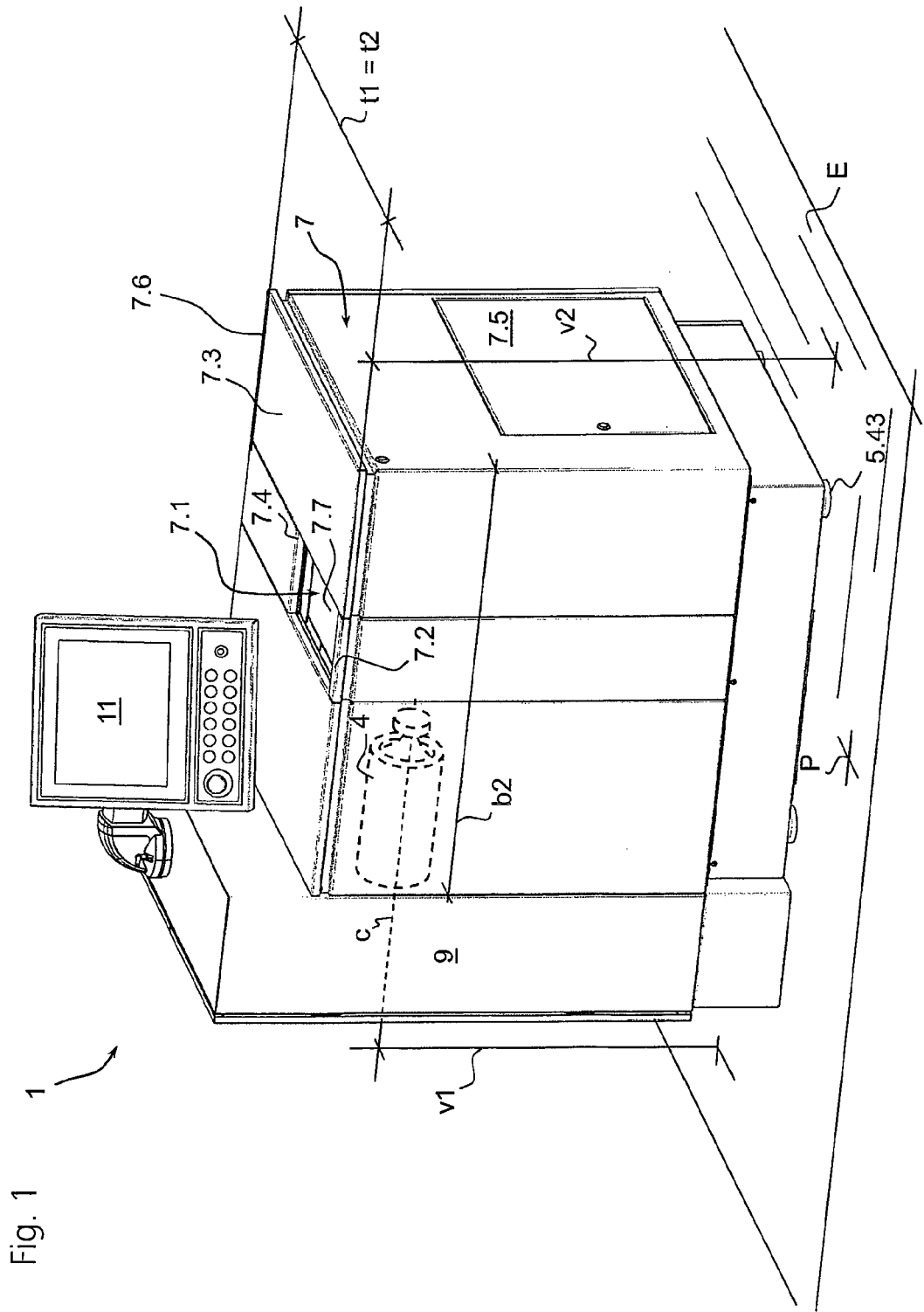
FIG. 1 shows a perspective view of the turning and cutting machine.

The turning and cutting machine 1 shown in FIG. 1 comprises a paneling 7 on all sides, which on a right-hand side has a maintenance flap 7.5 and which is limited above by a lid 7.3. The lid 7.3 comprises a recess 7.4 for an access opening 7.1. With regard to an operator position P, a switch cabinet 9 is provided on the left-hand side of the turning and cutting machine 1, on which an operating panel 11 is arranged in such a manner that it can be pivoted. The switch cabinet 9 is here higher than the paneling 7, or the paneling lid 7.3. The lid 7.3 is joined in the area of a rear edge 7.6 in such a manner that it can be pivoted, and is to be folded open upwards by the operator in the position P. For this purpose, the operating panel 11 should be pivoted towards the left-hand side in advance.

In the folded open state of the lid 7.3 (not shown), the turning and cutting machine 1 is freely accessible from above; in particular in the folded open state of the lid 7.3, all drives can be maintained or replaced. The access opening 7.1 or the recess 7.4 serve as access for regular or manual workpiece replacement. The access opening 7.1 is closed by a glass separator 7.7 during operation. For the purpose of replacing workpieces, the glass separator 7.7 opens in a translatory direction towards the rear, so that from above, the access to the workpiece spindle 4 (shown as sketch) is guaranteed through the access opening 7.1 within the recess 7.4.

The turning and cutting machine 1 comprises a support plane E which is tensioned by the mounting feet 5.43 which are not shown in further detail, and in principle overlaps with a mounting or floor surface. The workpiece spindle 4, which is only shown as a sketch, comprises a rotational axis C which with regard to the support plane E comprises a vertical displacement v1 of approximately 830 mm. The lid 7.3 comprises a depth t2 which corresponds to the depth t1 of the turning and cutting machine 1 and which is approximately 930 mm.

The access opening 7.1 or the recess 7.4 comprise a front or lower edge 7.2, via which the operator reaches into the access opening 7.1 in the position P for the purpose of replacing the workpiece. The lower edge 7.2 comprises a vertical displacement v2 with regard to the support plane E, which is approximately 1030 mm in size.

Figure 2:
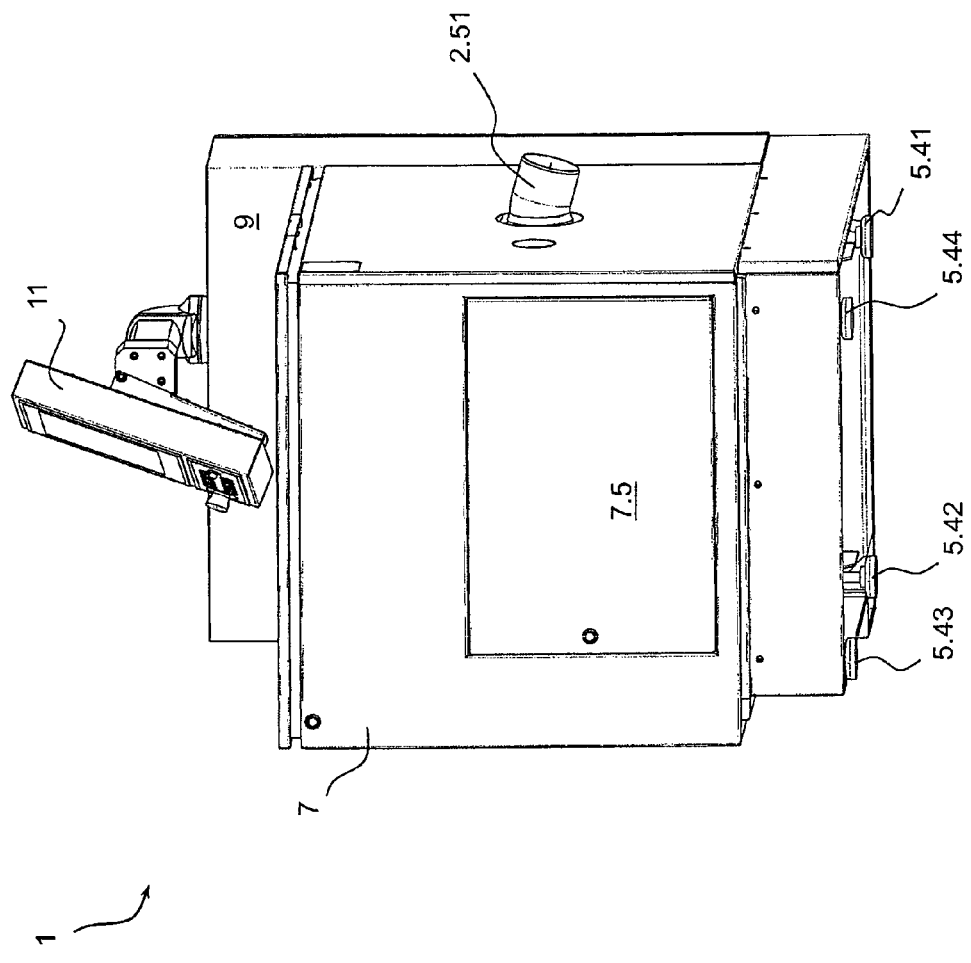
FIG. 2 shows a perspective view of the turning and cutting machine from the right.

FIG. 2 shows the turning and cutting machine 1 in the view from the lower right-hand side. The paneling 7 is opened downwards, where four mounting feet 5.41 to 5.44 protrude, via which the turning and cutting machine 1 can be positioned on a floor or mounting surface, not shown. The four mounting feet 5.41 to 5.44 tension the support plane E named above. In the area of the rear side of the paneling 7, a discharge pipe 2.51 is provided which is connected to a run-off opening 2.5 according to FIG. 3.

Figure 3:
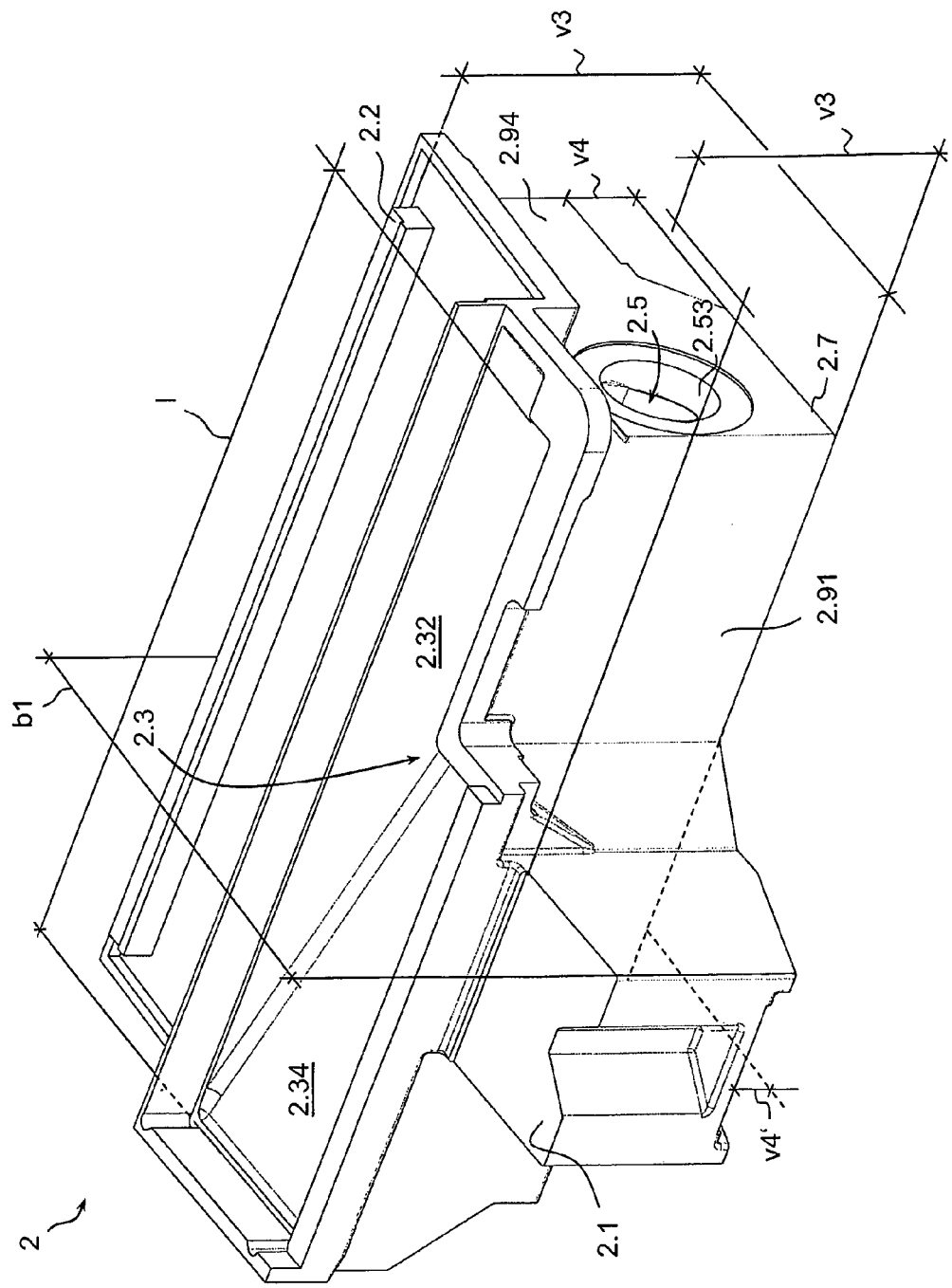
FIG. 3 shows a perspective view of the machine bed from the rear right.
Figure 8A:
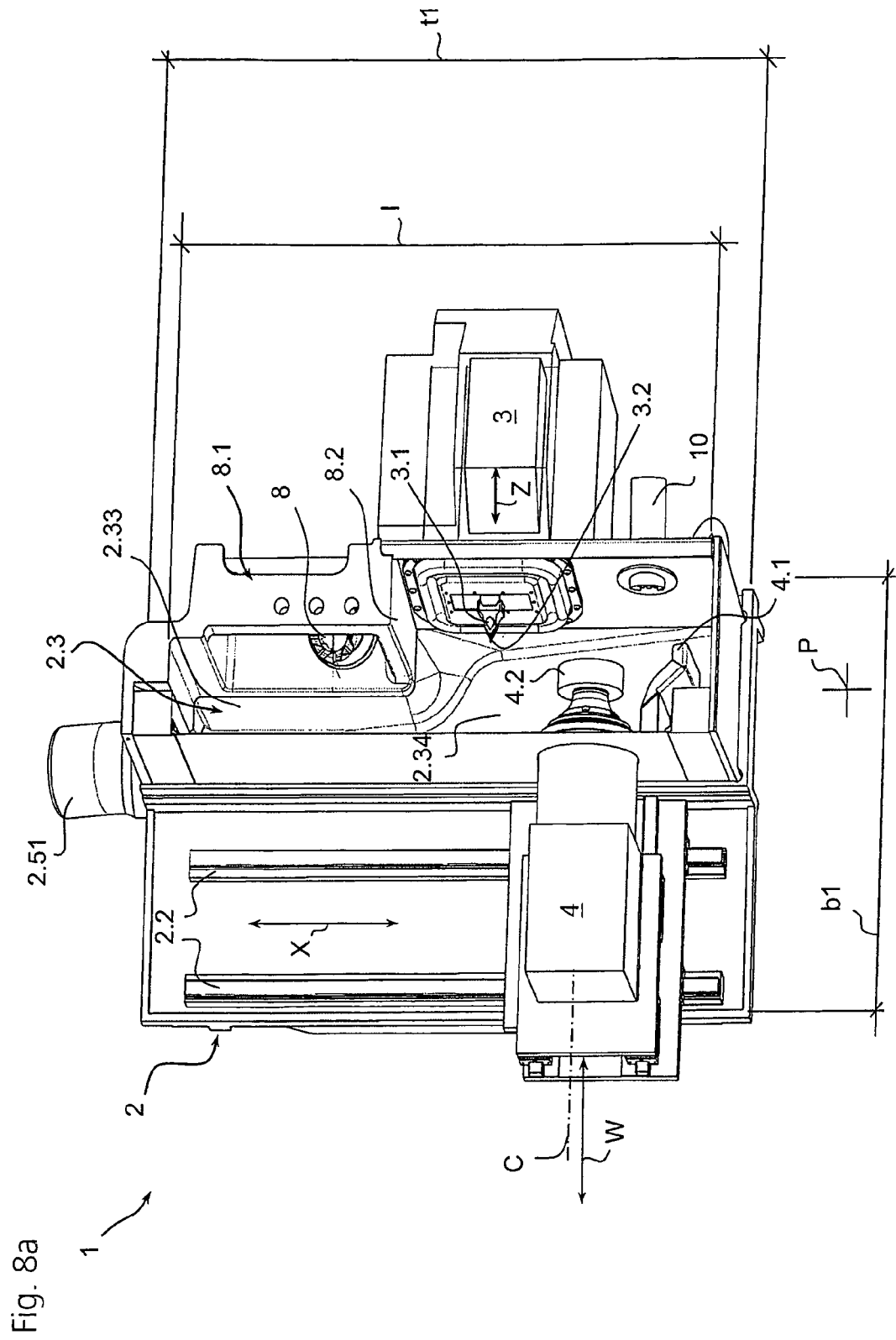
FIG. 8a shows a perspective view of the turning and cutting machine from above with the workpiece spindle in a front position.

FIG. 3 shows only the machine bed 2 from the rear right-hand side with regard to the operator position P. The machine bed 2 comprises a first bearing surface 2.1 for a linear motor 3 according to FIG. 5, and a second bearing surface 2.2 for the workpiece spindle 4. The second bearing surface 2.2 is formed from a pair of bearing rails, which are mounted on the machine bed 2. Between the two bearing surfaces 2.1, 2.2, a chip space 2.3 is provided. The chip space 2.3 comprises a floor wall 2.34 which slopes down towards the rear towards the run-out opening 2.5, and a left side wall 2.32. A right side wall 2.33 is shown in FIG. 8a, while a rear side wall 2.31 is shown with the run-off opening 2.5 in FIG. 5. The bearing surface 2.1 of the linear motor is arranged with regard to the chip space 2.3 opposite the bearing surface 2.2 of the workpiece spindles. The machine bed 2 extends in the vertical direction over a height v3 of approximately 200 mm and is limited by four side walls 2.91 to 2.94. Below the bearing surfaces 2.1, 2.2, three bearing points 2.41 to 2.43 are provided according to FIG. 4, which according to FIG. 3 comprise with regard to a lower edge 2.7 of the machine bed 2 a vertical displacement v4, v4' at a height of approximately 60 mm.

The chip space 2.3 comprises almost no depth in the front area of the side wall 2.94 and due to the floor wall 2.34 which slopes downwards becomes increasingly deep towards the rear. The increasing depth leads to a reduced residual height of the machine bed structure which is arranged below the floor wall 2.34. In order to guarantee the lowest possible reduction of the two transverse ribs 2.81, 2.82, this is located, together with the bearing surface 2.1 for the linear motor, in the first half of the chip space 2.3 with regard to a length 1 of the chip space 2.3. In this manner, the two transverse ribs 2.81, 2.82, can be at least over 50% to 90% of the height v3.

The machine bed 2 has a width b1 of approximately 680 mm. The chip space 2.3 has a length l which is approximately 90% of the length of the machine bed 2.

In the rear side wall 2.94, the run-off opening 2.5 is arranged, to which a channel wall 2.53 is connected as part of the side wall 2.94.

Figure 4:
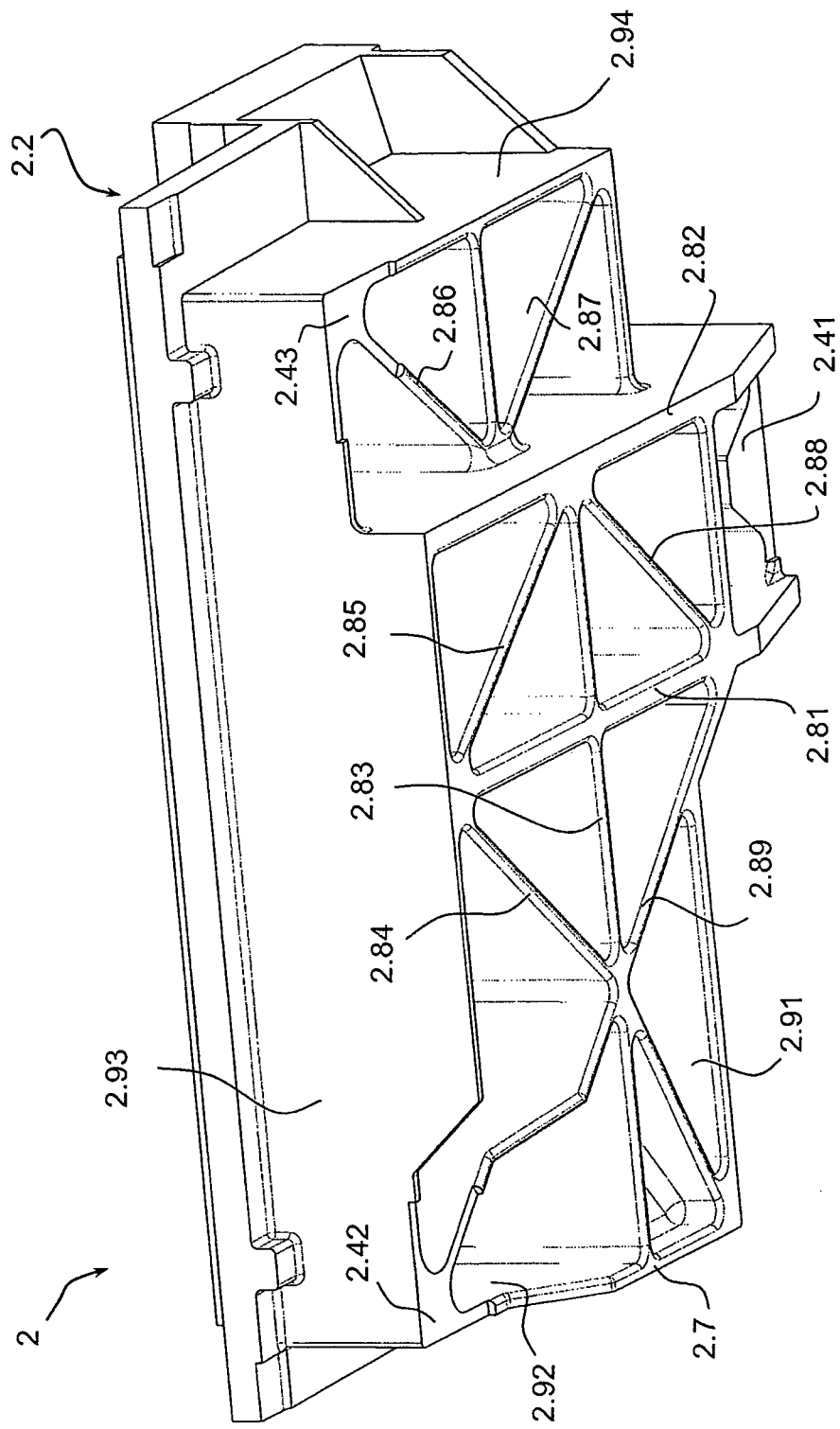
FIG. 4 shows a perspective view of the machine bed from the rear left.

The drawing in FIG. 4 shows the machine bed 2 in the view from the lower left-hand side. Within the four side walls 2.91 to 2.94, two transverse ribs 2.81, 2.82 and a longitudinal rib 2.83 which is centrally arranged are provided. The forenamed ribs 2.81 to 2.83 here extend largely over the height v3 of the machine bed 2. The machine bed body 2 is divided into six segments by the four side walls 2.91 to 2.94 and the transverse ribs 2.81, 2.82 which run transverse to it, and the longitudinal rib 2.83. Within the respective segment, a diagonal rib 2.84 to 2.89 is provided as a supplement. The two diagonal ribs 2.84 and 2.89 here extend respectively over two segments.

The bearing point 2.41 is as already described above provided below the bearing surface 2.1 for the linear motor 3, while the two bearing points 2.42 and 2.43 are arranged below the bearing surface 2.2 for the workpiece spindle 4, on the outer corner of the machine bed 2 respectively.

Figure 5:
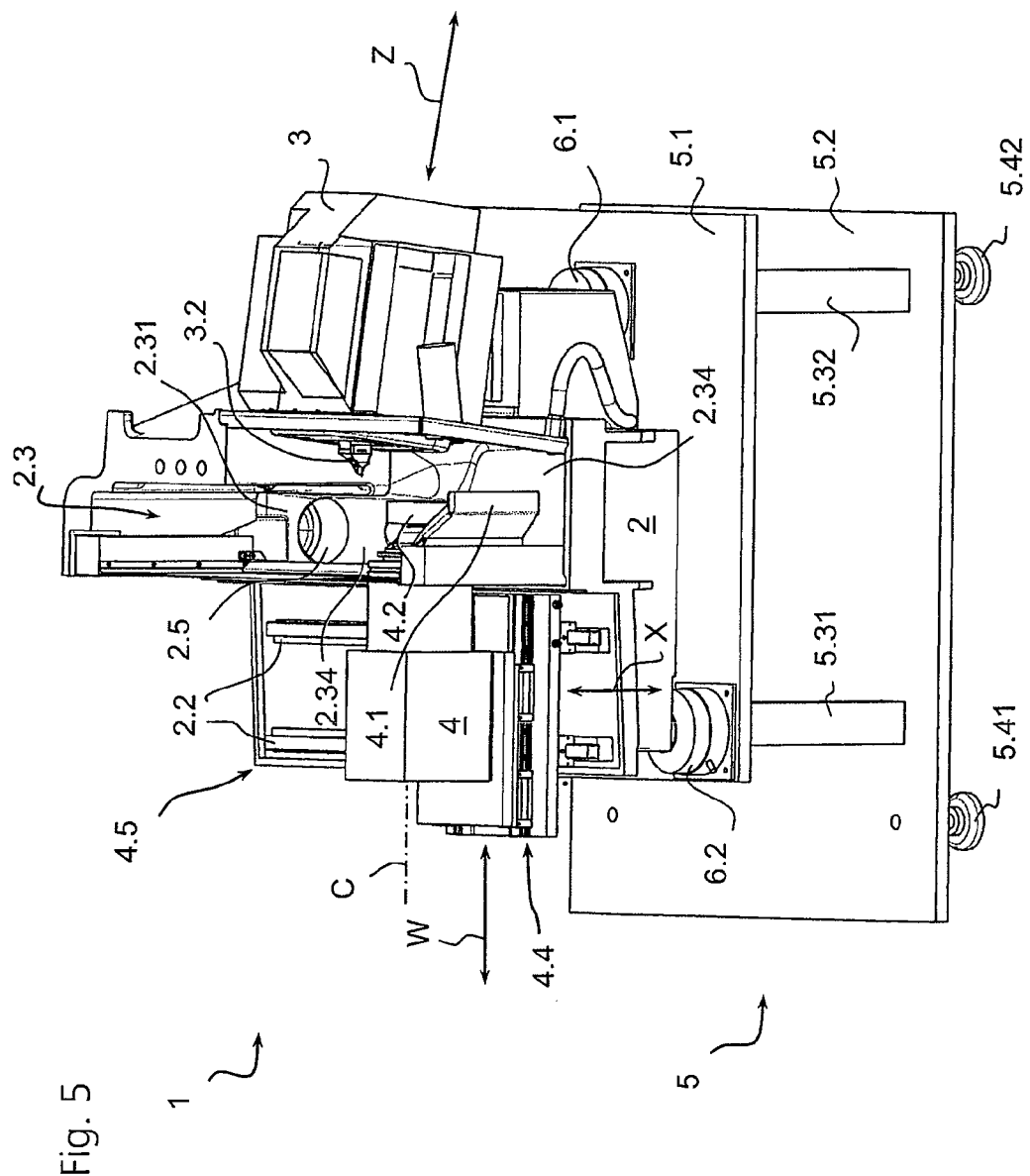
FIG. 5 shows a perspective view of the turning and cutting machine from the front without paneling elements.

According to FIG. 5, the turning and cutting machine 1 is shown in the view from the front without the paneling 7. The machine bed 2 rests via the cushioning bearings 6.1, 6.2 on a machine frame 5, or a support plate 5.1 of the machine frame 5. The support plate 5.1 is supported via four support parts 5.31, 5.32 on a base plate 5.2, which in turn is supported via the four mounting feet 5.41, 5.42. On the bearing surface 2.2, the workpiece spindle 4 is arranged with the rotational axis C. The workpiece spindle 4 with the workpiece 4.2 can be moved in a translatory direction over a first axial bearing 4.4 in the direction of the translation axis W and over a second axial bearing 4.5 in the direction of the movement axis X. With regard to the chip space 2.3, the linear motor 3 is supported opposite with the rotary chisel 3.2 with the oscillation axis Z. The chip space 2.3 is limited to the rear by the rear side wall 2.31. The run-off opening 2.5 is provided within the side wall 2.31, bordering the floor wall 2.34. A screen part 4.1 is provided on the workpiece spindle 4.

Figure 6:
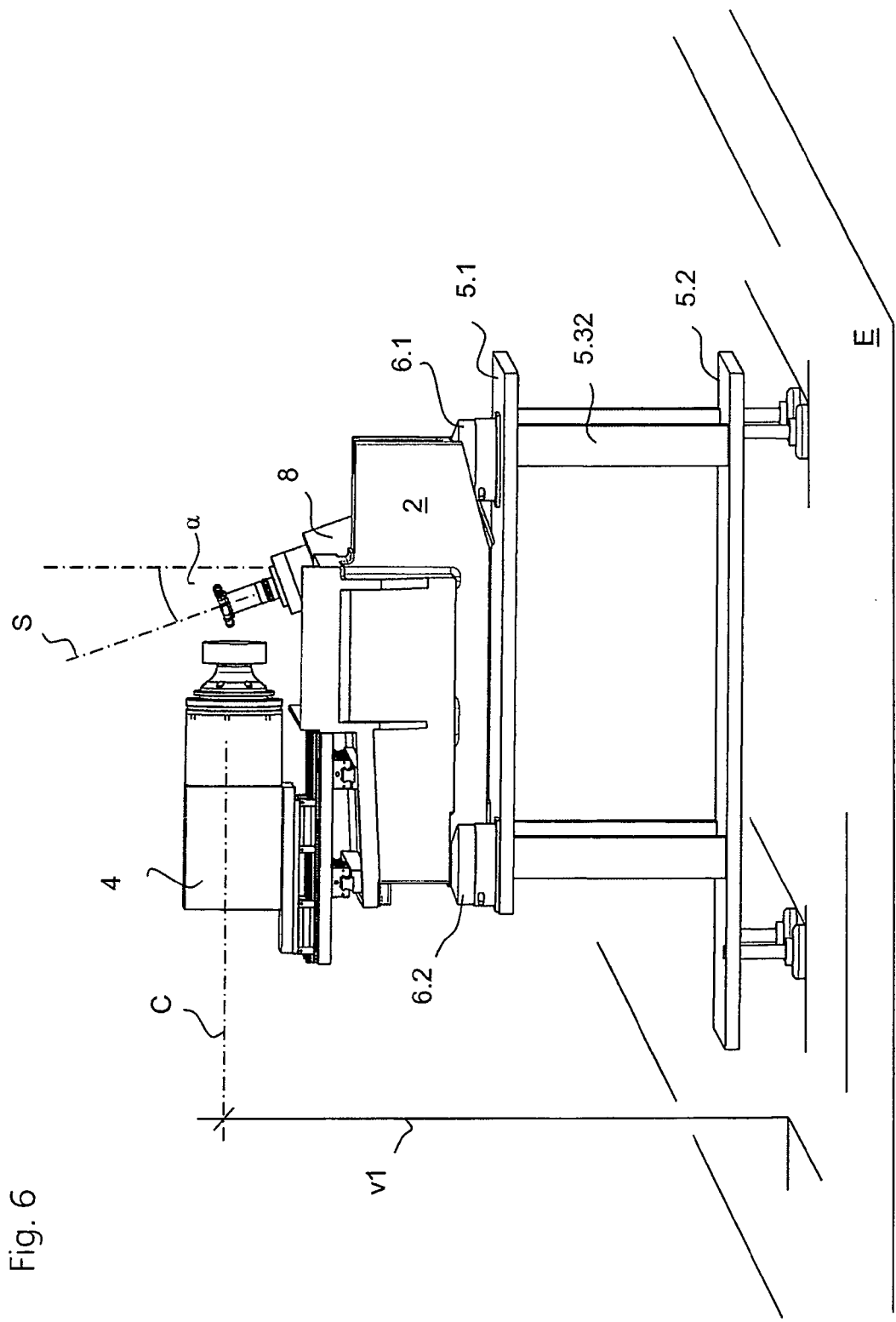
FIG. 6 shows a perspective view of the turning and cutting machine from the front.

According to FIG. 6, a cutting spindle 8 with a spindle axis S is provided adjacent to the linear motor 3 not shown, wherein the spindle axis S is pitched with regard to the vertical axis at an angle α of approximately 20°.

The rotational axis C of the workpiece spindle 4 comprises a vertical displacement v1 of approximately 830 mm in relation to the support plane E.

Figure 7:
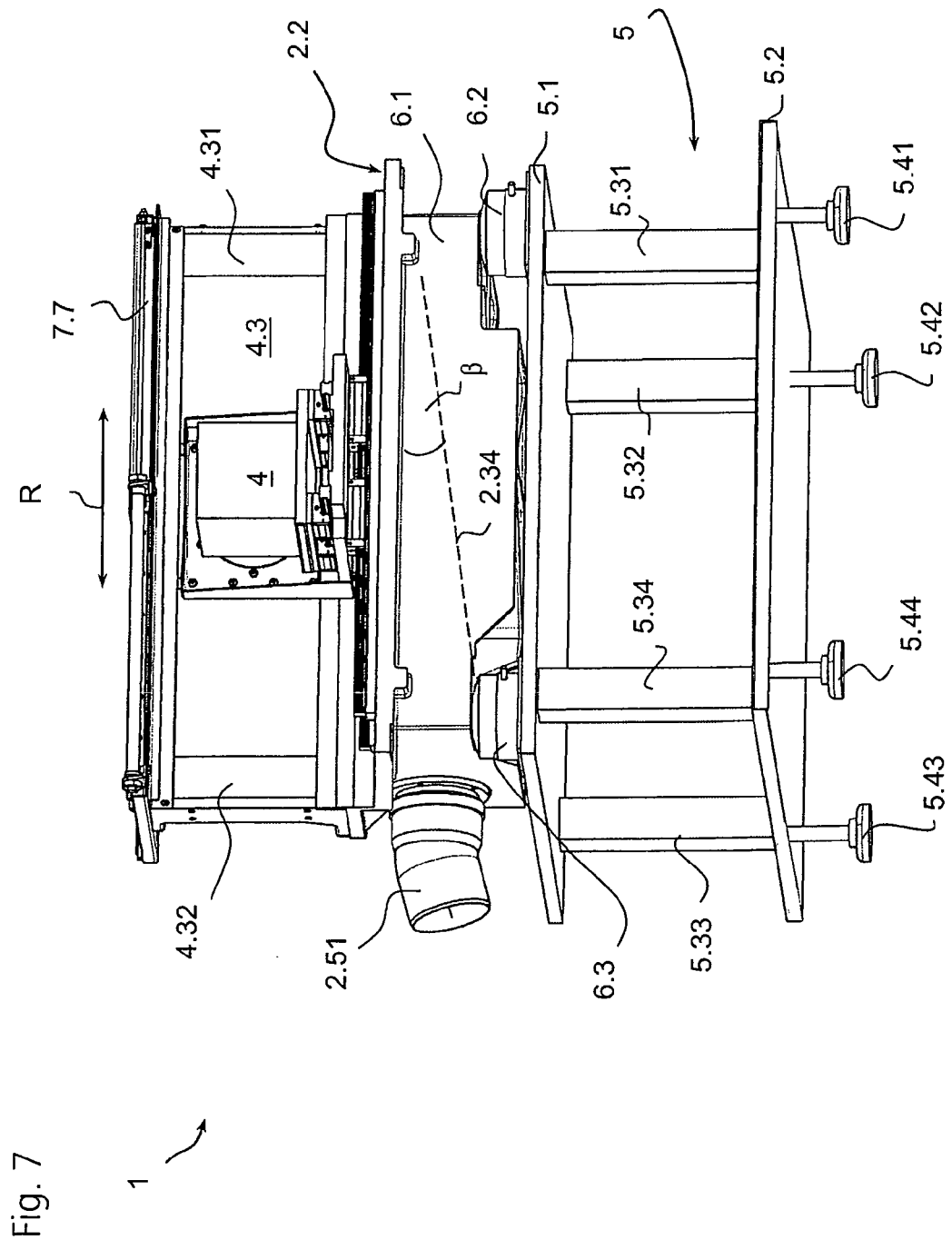
FIG. 7 shows a perspective view of the turning and cutting machine without paneling elements from the rear left.

In the drawing shown in FIG. 7, all four support parts 5.31 to 5.34 including the four mounting feet 5.41 to 5.44 are shown. The rear cushioning bearing 6.3 is also shown. The floor wall 2.34 of the chip space 2.3 is also shown as a sketch; it runs with regard to the horizontal plane pitched at an angle β of approximately 13°.

The workpiece spindle 4 is separated from the work space via a screen blind 4.3, which is affixed on both sides to the spindle. The screen blind 4.3 comprises a right and a left blind mechanism 4.31, 4.32, via which the blind is rolled up or down on the respective side.

On the upper side, the glass separator 7.7 can be seen which in order to reach in and replace the workpiece can be displaced in the arrow direction R.

According to FIG. 8*a*, the workpiece spindle 4 comprises the screen part 4.1, which is displaced with the workpiece spindle 4 in the direction of the movement axis X. Via the screen part 4.1, the chip space 2.3 which is arranged opposite the workpiece 4.2 is protected against chip flight, as is explained in greater detail below. Furthermore, means 10 for feeding cooling and lubrication fluid are provided in the form of a cooling fluid line 10. In the position shown here, the workpiece spindle 4 is located at the very front at the operator position P. From the operator position P, the operator can replace the workpiece 4.2 via the glass separator 7.7 described above, or the access opening 7.1.

The machine bed 2 has a depth t1 of approximately 930 mm.

Figure 8B:
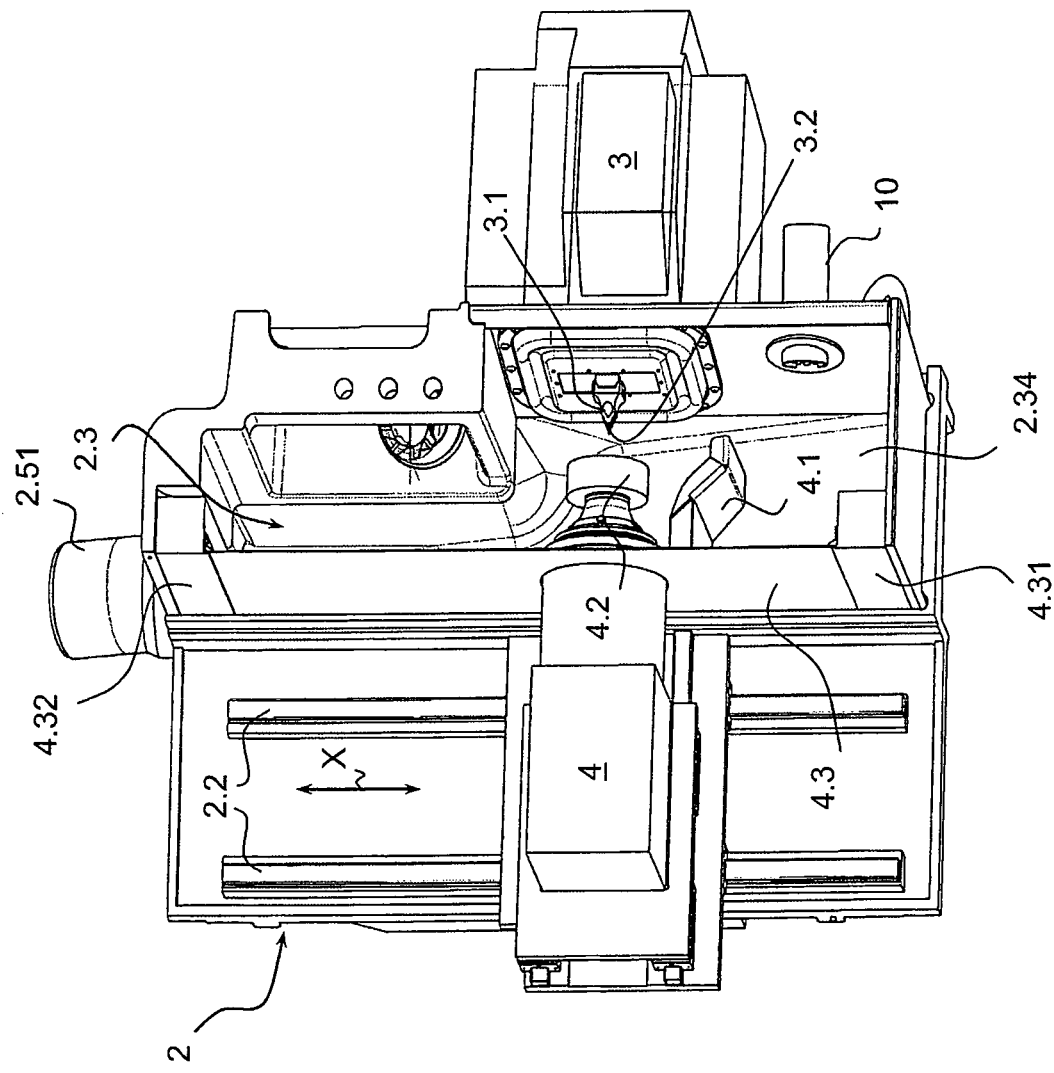
FIG. 8b shows a drawing according to FIG. 8a with the workpiece spindle in a second position on the rotary chisel.

According to the drawing in FIG. 8*b*, the workpiece spindle 4 is in a second position directly opposite the linear motor 3 and the rotary chisel 3.2 moved by the linear motor 3. In the second position it already becomes clear how the screen wall 8.2 at least partially separates the front part of the chip space 2.3.

Figure 8C:
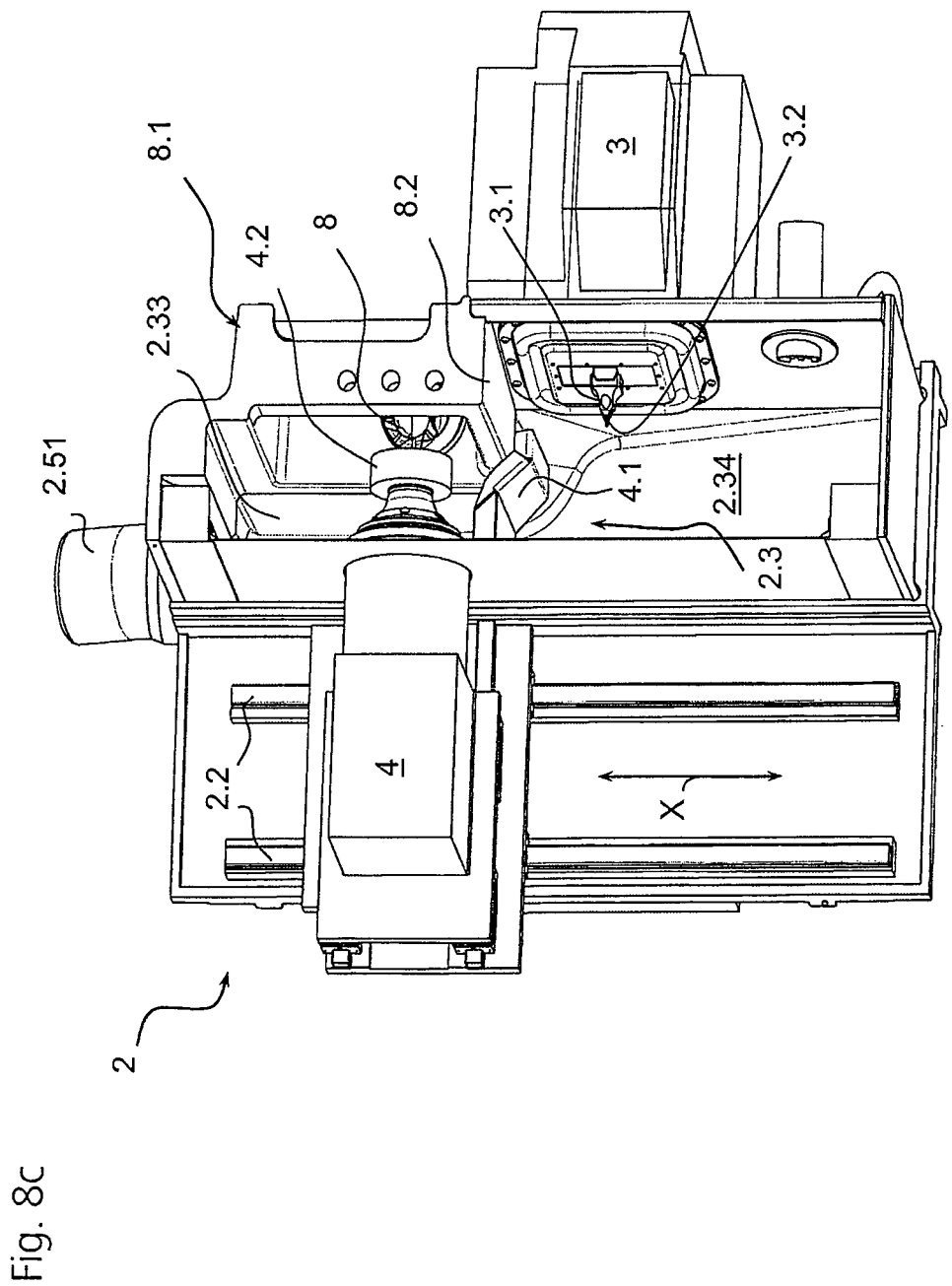
FIG. 8c shows a drawing according to FIG. 8b with the workpiece spindle in a third position on the cutter.
Figure 8D:
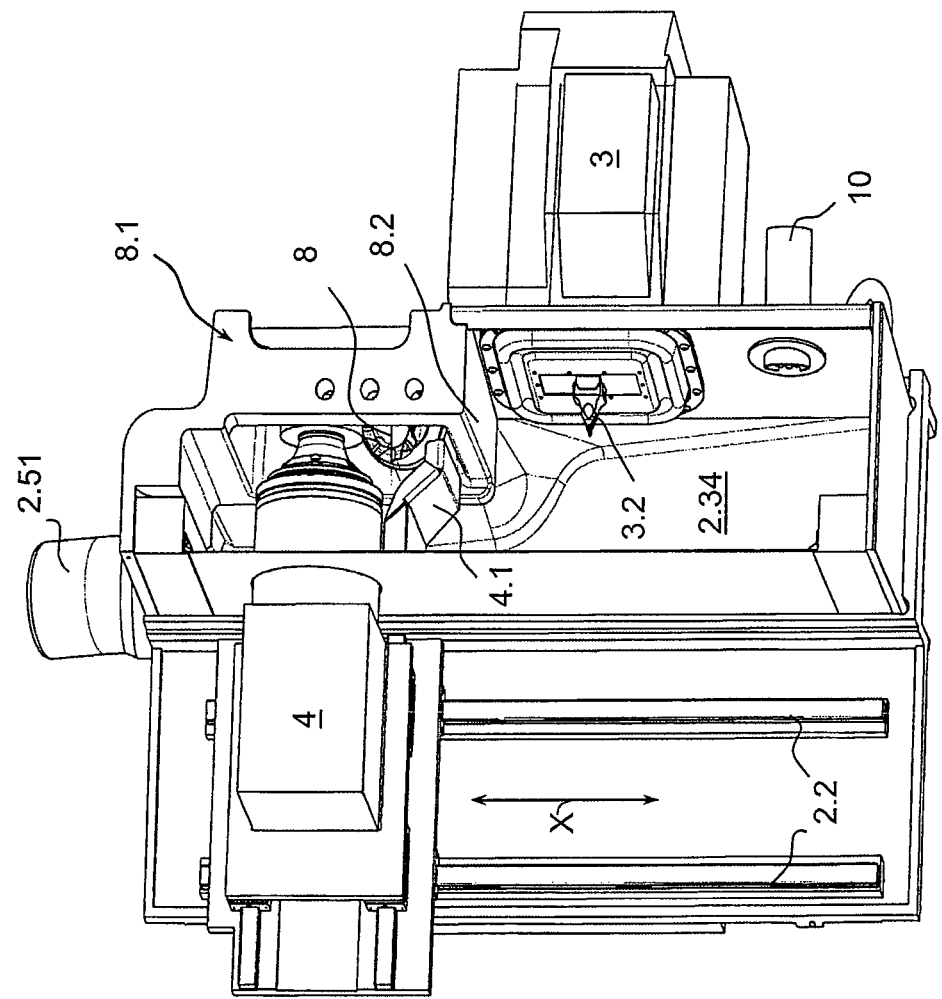
FIG. 8d sows a drawing according to FIG. 8a with the workpiece spindle in a fourth position to the side of the cutter.

According to the drawing in FIG. 8*c*, the workpiece spindle 4 is located in a third position directly opposite the cutting spindle 8. In this position, as with the rotary chisel 3.2, the front surface of the workpiece 4.2 is machined. The cutting spindle 8 here turns with regard to FIG. 8*c* in the clockwise direction, so that the chip flight which results occurs predominantly to the rear towards the run-off opening 2.5 not shown. In order to prevent the screen part 4.1 from colliding with the rotary chisel 3.2 when the workpiece spindle 4 is moved in the direction of the movement axis X, it has a limited length. In the third position shown here, the screen part 4.1 is placed directly in the area of a screen wall 8.2 of a bearing part 8.1 for the cutting spindle 8. The screen part 4.1 and the screen wall 8.2 separate the cutting spindle 8 and the workpiece 4.2 or the rear part of the chip space 2.3 from the front part of the chip space 2.3, at least in the direction of the movement axis X. The bearing part 8.1 is here firmly bolted to the machine bed 2.

In the drawing shown in FIG. 8*b*, the workpiece spindle 4 is located with regard to the movement axis X behind the cutting spindle 8, for the purpose of machining the edge surface of the workpiece 4.2. The screen part 4.1 together with the screen wall 8.2 forms the separation against the front part of the chip space 2.3.

On the basis of the cooling and lubrication fluid line 10, adjusting nozzles, not shown in greater detail, are provided by means of which the cooling and lubricating agent is fed directly into the area of the rotary chisel 3.2.

LIST OF REFERENCE NUMERALS

1 Turning machine, turning and cutting machine
2 Machine bed, machine bed body
2.1 Bearing surface
2.2 Bearing surface
2.3 Chip space
2.31 Wall, side wall, rear wall
2.32 Wall, side wall, left wall
2.33 Wall, side wall, right wall
2.34 Wall, floor wall
2.41 Bearing point
2.42 Bearing point
2.43 Bearing point
2.5 Run-off opening
2.51 Discharge pipe
2.52 Discharge
2.53 Channel wall
2.7 Lower edge
2.81 Transverse rib
2.82 Transverse rib
2.83 Longitudinal rib
2.84 Diagonal rib
2.85 Diagonal rib
2.86 Diagonal rib
2.87 Diagonal rib
2.88 Diagonal rib
2.89 Diagonal rib
2.91 Right side wall
2.92 Left side wall
2.93 Front side wall
2.94 Rear side wall
3 Linear motor
3.1 Rotary tool holder
3.2 Rotary chisel
4 Workpiece spindle
4.1 Screen part
4.2 Workpiece
4.3 Screen blind
4.31 Blind mechanism
4.32 Blind mechanism
4.4 First axial bearing
4.5 Second axial bearing
5 Machine frame
5.1 Support plate
5.2 Base plate
5.31 Support part
5.32 Support part
5.33 Support part
5.34 Support part
5.41 Mounting foot
5.42 Mounting foot
5.43 Mounting foot
5.44 Mounting foot
6.1 Cushioning bearing
6.2 Cushioning bearing 6.3 Cushioning bearing
7 Paneling
7.1 Access opening
7.2 Lower edge, front edge
7.3 Lid
7.4 Recess
7.5 Maintenance flap
7.6 Rear edge
7.7 Glass separator
8 Cutting spindle
8.1 Bearing part
8.2 Screen wall
9 Switch cabinet
10 Means, cooling fluid line
11 Operating panel
b1 Width, machine bed, value
b2 Width, lid
C Rotational axis
E Support plane
l Length
m1 Mass, machine bed
m2 Mass, moved
m3 Mass, overall
P Operator position
Q Quotient
R Direction
S Spindle axis
t1 Depth, turning machine, value
t2 Depth, lid
v1 Value, displacement
v2 Value, displacement
v3 Value, displacement, height
v4 Value, displacement
v4' Value, displacement
W Translation axis
X Movement axis
Z Oscillation axis
α Angle
β Angle

What is claimed is:

1. A turning machine for producing non rotationally symmetric surfaces of synthetic spectacle lenses, comprising a support plane (E), a machine bed with a width b1, a linear motor with an actuator comprising a turning tool holder and an oscillation axis Z, a workpiece spindle with a rotational axis C and a movement axis X, wherein the machine bed comprises at least two bearing surfaces arranged at a distance for the linear motor and for the workpiece spindle, and between the two bearing surfaces, a chip space is provided which is limited at least partially by the machine bed, wherein the linear motor is supported on the first bearing surface and the workpiece spindle is supported on the second bearing surface in relation to the chip space opposite the linear motor, wherein the mass of the machine bed has the maximum value m1, wherein the value m1 lies between 100 kg and 500 kg.

2. A turning machine for producing non rotationally symmetric surfaces of synthetic spectacle lenses, comprising: a support plane (E), a machine bed with a width b1 and a mass m1, a linear motor with an actuator comprising a turning tool holder and an oscillation axis Z, a workpiece spindle with a rotational axis C and a movement axis X, wherein the machine bed comprises at least two bearing surfaces arranged at a distance for the linear motor and for the workpiece spindle, and between the two bearing surfaces, a chip space is provided which is limited at least partially by the machine bed, wherein the linear motor is supported on the first bearing surface and the workpiece spindle is supported on the second bearing surface in relation to the chip space opposite the linear motor, wherein the ratio of a moved mass m2 of the linear motor to the mass m1 of the machine bed is greater than a quotient Q, wherein the quotient Q is between 1:500 and 1:20.

3. The turning machine according to claim 1, wherein the machine bed is a cast iron bed which is open below, which comprises several transverse ribs which run in the direction of the oscillation axis Z and/or at least one longitudinal rib which runs in the direction of the movement axis X, wherein the transverse ribs extend between the bearing surface for the linear motor and the bearing surface for the workpiece spindle.

4. The turning machine according to claim 3, wherein the transverse rib is designed to be at least 50% to 90% of the height of the machine bed in the area of the bearing surface for the linear motor, wherein the bearing surface for the linear motor is arranged with regard to a length of the chip space in the same half of the machine bed in which the chip space, which comprises a downwards sloping floor wall that comprises a lesser depth.

5. The turning machine according to claim 1, wherein the machine bed comprises a maximum of three bearing points, wherein at least one first bearing point is provided below the bearing surface for the linear motor.

6. The turning machine according to claim 5, wherein the second and one third bearing point are provided below the bearing surface for the workpiece spindle on a front and on a rear end of the machine bed.

7. The turning machine according to claim 5, wherein each of the bearing points comprise a vertical displacement v4 or v4' with regard to the lower edge of the machine bed, which is at least between 20 mm and 70 mm.

8. The turning machine according to claim 1, wherein the machine bed comprises a lower edge and between the lower edge and the bearing surface, a vertical displacement is provided with a maximum value v3, wherein the value v3 lies between 100 mm and 300 mm.

9. The turning machine according to claim 1, wherein the turning machine has a depth with a maximum value t1 with regard to an operator position (P), and the value t1 lies between 800 mm and 1050 mm.

10. The turning machine according to claim 9, wherein the machine bed has a width with a maximum value b1 with regard to the operator position (P), and the value b1 lies between 500 mm and 900 mm.

11. The turning machine according to claim 1, wherein the rotational axis C of the workpiece spindle comprises a vertical displacement with regard to the support plane (E) of the turning machine, which has a maximum value v1, wherein the value v1 lies between 600 mm and 1050 mm.

12. The turning machine according to claim 1, wherein the chip space is limited to one side by at least one wall of the machine bed which is pitched in relation to the horizontal axis, in which a run-off opening is provided, wherein the run-off opening of the chip space is arranged in such a manner that the medium to be transported leaves the chip space towards one side.

13. The turning machine according to claim 1, wherein a paneling is provided with an access opening, which guarantees a regular manual workpiece, tool and motor replacement, and which comprises an edge, wherein the edge comprises a maximum vertical displacement with regard to the support plane (E), which has a maximum value v2, wherein the value v2 lies between 900 mm and 1200 mm.

14. The turning machine according to claim 9, wherein a switch cabinet is provided which is arranged to the left or right of the machine bed with regard to the operator position (P).

15. The turning machine according to claim 1, wherein in the functional embodiment, an overall mass with a maximum value m3 is specified, wherein the value m3 lies between 500 kg and 1000 kg.

16. The turning machine according to claim 2, wherein the machine bed is a cast iron bed which is open below, which comprises several transverse ribs which run in the direction of the oscillation axis and/or at least one longitudinal rib which runs in the direction of the movement axis, wherein the transverse ribs extend between the bearing surface for the linear motor and the bearing surface for the workpiece spindle.

17. The turning machine according to claim 16, wherein the transverse rib is designed to be at least 50% to 90% of the height of the machine bed in the area of the bearing surface for the linear motor, wherein the bearing surface for the linear motor is arranged with regard to a length of the chip space in the same half of the machine bed in which the chip space, which comprises a downwards sloping floor wall that comprises a lesser depth.

18. The turning machine according to claim 2, wherein the machine bed comprises a maximum of three bearing points, wherein at least one first bearing point is provided below the bearing surface for the linear motor.

19. The turning machine according to claim 18, wherein the second and one third bearing point are provided below the bearing surface for the workpiece spindle on a front and on a rear end of the machine bed.

20. The turning machine according to claim 19, wherein each of the bearing points comprise a vertical displacement v4 or v4' with regard to the lower edge of the machine bed, which is at least between 20 mm and 70 mm.

21. The turning machine according to claim 2, wherein the machine bed comprises a lower edge, and between the lower edge and the bearing surface, a vertical displacement is provided with a maximum value v3, wherein the value v3 lies between 100 mm and 300 mm.

22. The turning machine according to claim 2, wherein the machine bed comprises a lower edge and between the lower edge and the bearing surface, a vertical displacement is provided with a maximum value v3, wherein the value v3 lies between 100 mm and 300 mm.

23. The turning machine according to claim 22, wherein the value v3 lies between 150 mm and 250 mm.

* * * * *